US010129945B2

(12) United States Patent
Coombes et al.

(10) Patent No.: US 10,129,945 B2
(45) Date of Patent: Nov. 13, 2018

(54) MODULAR LIGHT CONTROL SYSTEM

(71) Applicant: Gooee Limited, St Albans (GB)

(72) Inventors: Simon Coombes, St Petersburg, FL (US); Shmuel Silverman, Novato, CA (US); Jonathan Couch, Wilshire (GB)

(73) Assignee: Gooee Limited, St Albans (GB)

( * ) Notice: Subject to any disclaimer, the term of this patent is extended or adjusted under 35 U.S.C. 154(b) by 0 days.

(21) Appl. No.: 15/880,317

(22) Filed: Jan. 25, 2018

(65) Prior Publication Data

US 2018/0220505 A1 Aug. 2, 2018

Related U.S. Application Data

(60) Provisional application No. 62/451,746, filed on Jan. 29, 2017.

(51) Int. Cl.
*H05B 37/02* (2006.01)
*G05B 19/042* (2006.01)
*H05B 33/08* (2006.01)

(52) U.S. Cl.
CPC ..... *H05B 33/0848* (2013.01); *H05B 37/0272* (2013.01); *H05B 33/0863* (2013.01)

(58) Field of Classification Search
CPC ............ H05B 33/0848; H05B 37/0272; H05B 33/0863
USPC .......................................................... 315/291
See application file for complete search history.

(56) References Cited

U.S. PATENT DOCUMENTS 8,253,346 B2 8/2012 Budike, Jr.
8,587,212 B2 11/2013 Li et al.
8,742,686 B2 6/2014 Zampini, II et al.
8,805,550 B2 8/2014 Chemel et al.
9,814,111 B1 11/2017 Huang et al.
2009/0278465 A1 11/2009 Farmer et al.
2010/0096993 A1 4/2010 Ashdown et al.
2011/0248644 A1 10/2011 Welten et al.
2011/0309759 A1 12/2011 Shteynberg et al.
2012/0043900 A1 2/2012 Chitta et al.
2013/0141007 A1 6/2013 Wood et al.
2013/0147351 A1 6/2013 Trainor et al.
2013/0187631 A1 7/2013 Russell et al.
2014/0159579 A1 6/2014 Seol
2014/0167609 A1 6/2014 Ryu et al.
(Continued)

FOREIGN PATENT DOCUMENTS

AU 2013204215 A1 10/2014
WO WO-2015112637 A1 7/2015

OTHER PUBLICATIONS

TW Patent Office Search Report in Taiwanese—TW Patent Application No. 105117198, p. 3 list of references cited, Feb. 14, 2017, and attached English language relevance, 4 pgs.

*Primary Examiner* — Daniel D Chang
(74) *Attorney, Agent, or Firm* — Moyles IP, LLC

(57) ABSTRACT

Devices, systems, and methods for exchanging information between a plurality of lighting devices and a gateway supporting a variety of dimming control protocols is described herein. Regardless of the specific native control protocol used by each of the lighting devices, the gateway is able to control the plurality of lighting devices. The gateway is assembled from modular components that enable a plurality of dimming protocols to be used simultaneously at a low overall system cost.

18 Claims, 9 Drawing Sheets

(56) References Cited

U.S. PATENT DOCUMENTS

| | | | | |
|---|---|---|---|---|
| 2014/0285113 | A1* | 9/2014 | Huang | H05B 37/0272 315/297 |
| 2014/0368118 | A1 | 12/2014 | Bhardwaj et al. | |
| 2015/0028776 | A1 | 1/2015 | McMillan | |
| 2015/0084503 | A1 | 3/2015 | Liu et al. | |
| 2015/0084547 | A1 | 3/2015 | Yeh et al. | |
| 2015/0198317 | A1 | 7/2015 | Feller et al. | |
| 2015/0216009 | A1 | 7/2015 | Lee et al. | |
| 2016/0057819 | A1 | 2/2016 | Wang et al. | |
| 2016/0057837 | A1 | 2/2016 | Brand et al. | |
| 2016/0081161 | A1* | 3/2016 | Phillips | H05B 37/0281 315/151 |
| 2016/0181911 | A1* | 6/2016 | Knauss | G01R 19/16538 315/209 R |
| 2017/0105263 | A1 | 4/2017 | Xiong et al. | |
| 2017/0127501 | A1* | 5/2017 | Isaacs | H05B 37/0272 |

* cited by examiner

Power Module

MODULAR LIGHT CONTROL SYSTEM

CROSS-REFERENCE TO RELATED APPLICATIONS

This application claims the benefit of U.S. Provisional Patent Application No. 62/451,746 filed Jan. 29, 2017, the entire disclosure of which is incorporated herein by reference in its entirety for all purposes.

FIELD

The disclosed devices, systems, and methods relate to modular control for controlling the dimming of luminaires.

BACKGROUND

Lighting control systems are often used to set up and/or control lighting scenes. The systems often switch/alternate between and dim luminaires, (commonly referred to as lamps or lighting devices or lighting units), and manage them in space and time. Due to the large scale and increased number of luminaires associated with these systems, there is a strong need to provide controllable and user-friendly systems. The user-friendly features of these systems often include easy programming and operation, along with simple installation processes. There is also a demand to balance this need by economic considerations. These economic considerations may be challenging to meet with an increased number of luminaires, particularly because large control systems that are predominantly digitally-based, and used to manage the increased number of luminaires, are often designed to allow the luminaires to be addressed individually in an effort to provide greater flexibility.

Lighting control systems can be integrated as a subsystem into a building management system. A lighting control network typically includes one or more lighting devices, such as, for example, electrical ballast, light emitting diode (LED) devices, and dimmers. The dimmers (or dimming control devices) must support specific interfaces (that communicate according to specific protocols) to be able to receive control inputs and dim the lights appropriately. Different luminaries often support different dimming control protocols, as follows.

Multiple standards have been developed since the early 1970's to allow standard control of light dimmers, through the use of light dimming and light control methods. The standards include, but are not limited to, 0-10VDC, 1-10VDC, AMX192, K92, A240, CMX, ECmux, Tmux, D54, and DMX512. Some of the original protocols, such as, 0-10VDC and 1-10VDC, are still in wide use today, as well as new additions, including Digital Addressable Lighting Interface (DALI®), DALI® Color, DMX and DMX-RDM.

Race to market and cost reduction requirements have led to the creation of numerous multiplex protocols to handle the dimming devices. However, these protocols are often manufacturer-specific and include proprietary schemes related to console-to-dimmer data communication, which are used to control the dimmers. Because most of these protocols were created in the early 1980s, which coincided with increased demand in the entertainment and architectural lighting markets, dimmer-per-circuit systems became the industry standard. Years later, however, while most of the control consoles became obsolete, the dimmers were not, which has left many dimmer standard interfaces in play.

Analog point-to-point control standards 0-10V and/or 1-10V send signals to the luminaires based on changing the voltage respectively between 0-10V and 1-10V. This technology is widely used in low-complexity lighting systems. The dimmer setting is often signaled via a separate control line. Controllers, such as electrical controllers, are used to regulate the output of light from the luminaire. Since this type of electrical control is not addressable, the control circuit for the control line must be electrically planned and its allocation cannot be changed. The circuits in the electrical installation determine the grouping of the luminaires. Any change of use requires a new arrangement of the connection and control lines. Feedback on lamp failure, etc., via the control lines, is not possible with the 0-10V and 1-10V technology.

The Digital Multiplexed (DMX) digital control protocol is predominantly used for stage lighting. In architectural lighting, this protocol is used for features such as media facades or stage-like room lighting effects. The data is transmitted via a dedicated 5-core cable at a transfer rate of 250 Kbits/s, which can control up to 512 channels. This protocol requires that each luminaire has an address bus. When using multichannel devices with color control and other adjustable features, each function requires a separate address. For a long time, the data transfer was unidirectional and only enabled the control of devices. It did not provide feedback on aspects such as lamp failure. The DMX 512-A version now allows for bidirectional communication.

Digital Addressable Lighting Interface (DALI®) is a control protocol that makes it possible to control luminaires, each luminaire having its respective DALI® protocol control gear. The system may allow user-friendly light management in architecture and may also be integrated as a subsystem into modern building control systems. It often includes a two-wire control line with a transfer rate of 1.2 Kbits/s, each wire being able to run together with a main supply cable in a 5-core cable. The bidirectional system may allow feedback from the luminaires on different aspects, such as, for example, lamp failure. The DALI® protocol often limits the number of devices to 64. The standard version stores the settings for a maximum of 16 luminaire groups and 16 light scenes within the control gear. Amongst other features, the DALI® protocol supports emergency testing with feedback on the life of the battery.

Many manufacturers are providing protocol converters between one-to-one and more protocols; however, the converters need to be set to a specific protocol. The setup is often done manually or at a factory. Some digital controllers are connected to computer systems or to a console, which may allow the setup to be done in the console and to be sent to the controller. A disadvantage with this arrangement is that the setup is often complex and includes numerous variables associated with it, such as the number of luminaires connected in a group and the desired effect associated with the dimming of the light, sensor information, ambiance, color temperature, and more.

The large number of LED and electric ballast devices installed in a customer site requires the installer to either limit the dimming protocols to a manageable number (most likely one) or to be able to support a plurality of dimming protocols. The act of limiting the dimming protocols also limits the options for customers to find alternative manufacturers and reduce cost of installation and maintenance. Further, allowing multiple dimming protocols causes maintenance and installation challenges, particularly because each new lighting device and/or change of a lighting device, needs to be introduced to a network of controllers and managed. One cannot simply install the new lighting device without proper network management, or the desired dimming results in that area will be impacted.

What is instead desired is a system that permits a user to simultaneously control a plurality of different luminaires regardless of the fact that each luminaire may be operated according to a different operating protocol system. Such a system would allow an end-user/customer to simultaneously use multiple standard protocols for lighting dimming and lighting control needs.

Further, there is a need for a system and method that provides lighting dimming and lighting control without requiring the identity of the specific protocols to be known by the operator or set prior to, or during, manual installation. Accordingly, the exemplary systems disclosed herein may automatically detect which protocols are in use and use these different protocols to control the operation of luminaires to provide enhanced customer satisfaction in a plurality of industries such as healthcare, fitness, retail, home and entertainment industries.

As such, there is thus a need for a system and a method that is dimming protocol agnostic (e.g., open to any protocol) to allow multiple different dimming protocols to coexist in a lighting network. The exemplary disclosed system allows customers to be device agnostic (e.g., able to select a variety of, or any, lighting device) in choosing the dimming protocols of their LEDs and/or electrical ballasts. As a result, customers can install a single network that can support multiple dimming interfaces and install any luminaire(s) that fit. When a new LED system or electrical ballast is installed, the gateway can be simply fitted via a simple adapter to the new/different and correct dimming interface and/or protocol that is handled by the lighting device, thus allowing a smooth transition between protocols with no need for an operator or manual intervention or change in the network.

Moreover, existing systems do not have the ability to cope well with failure. Specifically, if one component in the system fails, the entire control system typically needs to be replaced. In contrast, as will be shown, the exemplary disclosed gateway has a modular design such that its various internal components can be individually removed and replaced (even when the system is powered and operating). Moreover, these gateway components can recognize the identities of one another such that continuous operation can be achieved and components can be replaced on the fly. It would also be desirable for the system to inform the operator if a dimming command is not being executed properly and/or the control module sending the dimming command needs to be replaced.

SUMMARY

In one aspect, an exemplary disclosed embodiment provides a system for controlling the operation of a plurality of luminaires having different dimming protocols, the system including: (a) a protocol agnostic modular gateway configured to control the dimming of the plurality of luminaires, wherein the luminaires have different dimming protocols, including: (i) a power module, (ii) a communication module, and (iii) a control module; wherein the power module, communication module and control module are all separately removable and replaceable components of the protocol agnostic modular gateway, and wherein the communication module and control module recognize one another after they are installed into the protocol agnostic modular gateway; (b) a sensor configured to take a sensor reading of the luminaire and send the sensor reading to the protocol agnostic modular gateway; and (c) a cloud server communicating with the protocol agnostic modular gateway, the cloud server being configured to control operation of the gateway.

The power module, communication module and control module may be plug-and-play or hot swappable components of the modular gateway.

In various aspects, the modular gateway identifies the protocols used by each of the plurality of luminaires by measuring responses in the luminaires to control signals sent from the modular gateway to the luminaires according to different protocols.

In various aspects, the cloud server instructs the modular gateway to control the dimming of the luminaires according to the protocols used by each of the plurality of luminaires. Specifically, the cloud server registers the protocols and control modules in use and can use sensor measurements to determine if the dimming protocols are operating correctly. If the components of the gateway are not performing correctly, or there is a mismatch between the control module and the dimming protocol that the luminaire is capable of handling, the system can notify the operator.

In various aspects, sensor measurement is used by the cloud server to determine if the system is operating as expected. Should the sensor(s) measure properties outside of expected norms, or measure that no effect has occurred when the diming protocol has changed, the system can then automatically re-calibrate.

In various aspects, the cloud server notifies an operator when: (a) the communication module and control module do not recognize one another after they are installed; or (b) when a dimming protocol which the control module is handling does not create the correct reaction or dimming level in the luminaire, e.g. is not operating.

Accordingly, an exemplary disclosed system simultaneously controls a plurality of lighting devices that use multiple standard operating protocols, and a system and method for exchanging information between a plurality of lighting devices and a gateway supporting a variety of dimming control protocols is described herein. The gateway can use a number of digital control protocols, or messages, as its input. Regardless of the specific control protocol known to the lighting devices, the gateway is able to control the plurality of lighting devices using control protocols that are native to each of the controlled lighting devices. The gateway has a modular design (i.e.: replaceable components) that provides a low overall system cost, and reduced replacement cost.

The exemplary gateway has three main physical components that can be individually removed and replaced (i.e.: Plug-N-Play or Hot Swap) to fit the correct dimming control protocol (i.e.: the dimming protocol that matches the luminaire). For example, different control/command modules (having different dimming protocols) can be swapped out with one another to ensure that the dimming protocol used by the control/command module matches the dimming protocol used by the specific luminaire in question. For example, a DALI® protocol control module can be switched out with a DMX control module should the luminaire be changed from a DALI® protocol-controlled luminaire to a DMX-controlled luminaire.

The exemplary disclosed modular gateway automatically discovers the dimming protocols that are used in the plurality of lighting devices, and then uses these dimming protocols to control the diming levels of each of the plurality of lighting devices. According to an aspect, an exemplary system includes at least one modular gateway, at least one of a plurality of luminaires and/or a plurality of LED's, at least one sensor subsystem, and at least one power meter for measuring power in real time. In an embodiment, at least one of the plurality of luminaires and/or the plurality of LED's is physically connected to the modular gateway via at least one dimming control interface. The sensor subsystem senses a plurality of color channels and monitors at least one change in environment in real time. In an embodiment, the at least one power meter, the plurality of luminaires/LEDs are connected to the at least one of the modular gateway.

In another aspect, the disclosure is directed to a method of discovering at least one dimming control protocol installed in the plurality of lighting devices and controlling dimming levels of the plurality of lighting devices. Advantageously, each luminaire can be controlled according to its own protocol. An exemplary disclosed method may include assuming the dimming control protocol installed based on a current modular gateway control module identification. In an embodiment, the assuming is performed by the modular gateway. The sensor(s) then feed information back to the modular gateway to allow the system to determine if the control of the luminaires is operating properly under the assumed protocol. The method may further include receiving at least one real time sensing measurement from at least one sensor subsystem and receiving at least one real time power measurement from at least one power meter. The measurements obtained by the sensor(s) and the power meter can then be used to update the identification of the protocol used by the luminaire, as required. Specifically, various dimming commands can be sent to the luminaire and the sensor(s) can measure the luminaire output (e.g.: color intensity and power drain). These sensor measurements allow the system to determine whether the dimming commands are successfully executed. Should the sensor measurements detect that nothing has happened or an incorrect result is achieved after a dimming command is sent, then the system can notify the operator. Potentially, the operator can rectify this problem simply by switching the control module to a control module having a different dimming protocol. According to an aspect of the present system, the at least one sensor subsystem is physically connected to the modular gateway, and the real time sensing measurement is received by the at least one modular gateway via at least one sensor interface. In an embodiment, the at least one power meter is physically connected to the at least one modular gateway, and the real time power measurement is received by the at least one modular gateway via at least one power interface.

The method may further include transmitting at least one dimming control command based on the real time sensing measurement and the at least one real time power measurement. The dimming control command may be transmitted by the at least one modular gateway via the at least one dimming control interface during a protocol discovery process. According to an aspect, the method further includes measuring at least one generated result via the at least one sensor subsystem and/or the at least one power meter, discovering the at least one dimming control protocol installed in at least one of the plurality of luminaires and/or the plurality of LED's, and controlling the dimming level of the at least one of the plurality of luminaires and/or the plurality of LED's. In an embodiment, the generated result is measured by the modular gateway, the dimming control protocol is discovered by the modular gateway, and the dimming level is controlled by the modular gateway.

According to another aspect, the modular gateway includes a communication module that changes a configuration of the power conversion module and the control module in response to different luminaire interfaces. The communication module outputs a corresponding control signal to the dimming control, which results in a correct dimming control action to meet the needs and specifications of the particular luminaire. In addition, due to its modular design, the failure detection and debugging process of the system becomes simpler. Upon detection of failure of any specific module, a new module can be substituted without a need to replace the entire device.

In an embodiment, the gateway modules each include a recognition unit which is used to identify one other. The first recognition unit or the second recognition unit can include an address chip, a microcontroller, a pin, or a latch working in conjunction with a micro switch, or a combination thereof.

In an embodiment, ease of maintenance and reduction of cost is achieved by means of the modular light control device generating corresponding control signals in response to different control methods. In this way the control device provides better design flexibility. Also, in addition to the characteristics and effects of the modular light control device, the dimming control system may further perform the dimming control actions on the luminaire through the modular light control gateway, as well as obtain the configuration and working state of the modular light control device at the same time.

Embodiments described herein provide a system that includes a modular gateway that supports plug-n-play (or hot swappable) wireless modules that can be WiFi, Bluetooth, or other wireless interfaces without limitation, both for local area networks and wide area networks like cellular. Each of the wireless modules are removable and interchangeable, and there is no need to change any other interface or module when replacing the wireless/wireline module in the gateway.

Embodiments described herein provide a system that includes the gateway, which is connected by way of a backhaul interface to the communication module via LAN, WLAN, WAN, Mesh BLE radio network or other means. This connection allows another device on the network local to the gateway or via WAN in the cloud, to handle the dimming protocol and luminaire control process. The communication module is a module that is physically interchangeable without impacting the other modules of the gateway.

Embodiments in accordance herewith provide a system that includes the gateway which detects the required dimming protocol that is utilized by the specific dimming device to which the gateway is physically connected to via the dimming interface. The dimming interface is part of the control module, and according to an aspect is a plug-n-play module that is interchangeable without the need to change any of the other modules of the gateway. When replacing a control module that supports a specific dimming protocol, the other modules discover and identify the change and translate dimming directives to the correct protocol according to the new physical control module.

Embodiments in accordance herewith provide a system that includes a gateway which continuously receives performance measurements from the sensors and from the power meter. These performance measurements can trigger the discovery of a new dimming protocol used by the luminaire. Specifically, if sensor measurements fall outside of expected parameters, it can be determined that the control module is not functioning properly (i.e.: the control module dimming protocol is not matching the luminaire dimming protocol). Thus, a physical change of the control module or the luminaire hardware may be carried out without further information being set in the system to indicate the type of luminaire or dimming device and its associated protocol. Instead, the gateway senses a change in sensor readings that does not correlate with information regarding the luminaire so far, and as a result will embark on a discovery process to identify the protocol used by the control module interface and support it. Upon identifying the new/changed control module protocol, the new dimming protocol information will be detected and sent to a cloud server and noted on a system level.

Embodiments in accordance herewith provide a system that includes a gateway which continuously receives performance measurements from the sensors. These performance measurements can trigger the discovery of the best dimming setup for delivering the appropriate requested RGB intensity, color temperature, environmental light level, etc., in real-time and based on the sensor measurements. This enables a change of dimming hardware and/or luminaire hardware (such as adding another luminaire device in-line with existing devices in the same environment), without first setting further information into the system to indicate the type of luminaire or dimming device and its protocol. Instead, the gateway senses a change that is not correlated with information regarding the luminaire so far, and as a result will embark on a discovery process to identify the protocol used by the control interface. If the control interface, e.g., the control module, was not changed, the system may trigger a report of the issue to the operator.

Embodiments in accordance herewith provide a system that includes a gateway, which can be software updated to handle new or different protocols and/or interfaces including dimming protocols, sensor interface protocols, discovery methods and gateway backend control protocols.

These and other advantages will be apparent from the present application of the embodiments described herein.

The preceding is a simplified summary to provide an understanding of some aspects of embodiments described herein. This summary is neither an extensive nor exhaustive overview of the present apparatus and method and its various embodiments. This summary presents selected concepts of the embodiments in a simplified form as an introduction to the more detailed description presented below.

BRIEF DESCRIPTION OF THE FIGURES

A more particular description will be rendered by reference to specific embodiments thereof that are illustrated in the appended drawings. Understanding that these drawings depict only typical embodiments thereof and are not therefore to be considered to be limiting of its scope, exemplary embodiments will be described and explained with additional specificity and detail through the use of the accompanying drawings in which.

Figure 1:
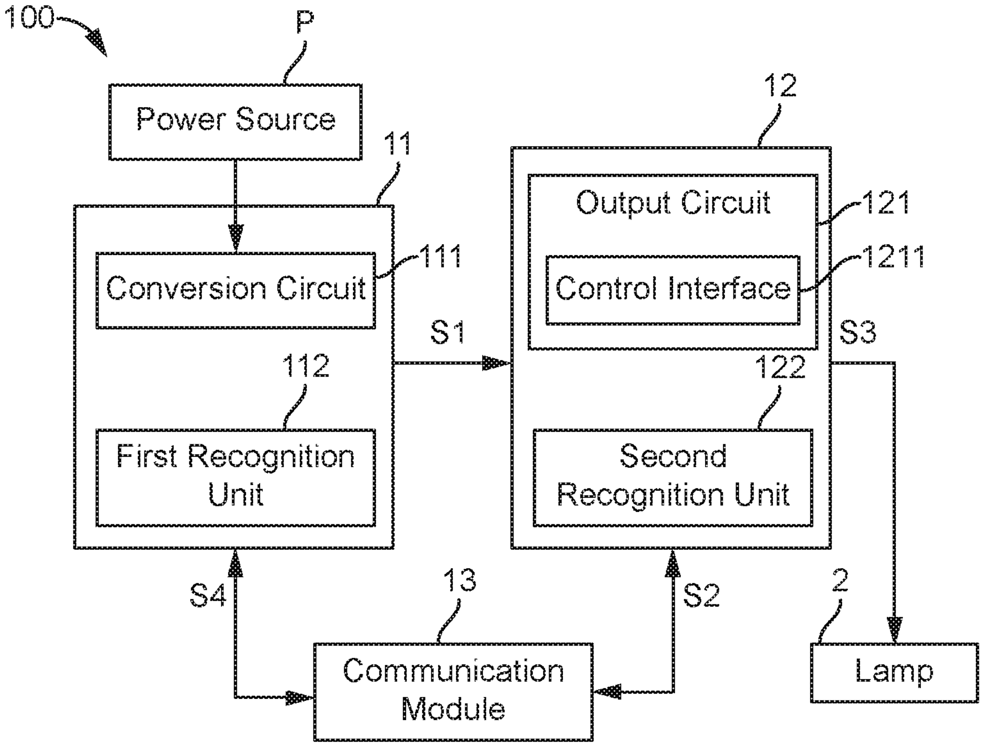
FIG. 1 is a schematic functional block diagram showing a modular light control device according to an embodiment.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

DETAILED DESCRIPTION

Reference will now be made in detail to various embodiments. Each example is provided by way of explanation, and is not meant as a limitation and does not constitute a definition of all possible embodiments.

In various embodiments, the present system controls a plurality of different lighting devices that use multiple standard protocols simultaneously. The system and method facilitate the exchange of information between a plurality of lighting devices and a self-discovery gateway (in which the gateway components recognize the dimming protocol in use). Additionally, the system provides dimming control and facilitates ease of system integration associated with the vast size of required systems, as well as ease of use and installation of such systems. Commonly owned U.S. patent application Ser. No. 15/373,088 filed Dec. 8, 2016, now U.S. Pat. No. 9,814,111, entitled Modular Light Control Device And Dimming Control System, and Taiwan Patent Application No. 105117198 filed in Taiwan, Republic of China on Jun. 1, 2016, are incorporated by reference herein in their entireties.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated that those individual aspects of the present disclosure can be separately claimed.

The term "computer-readable medium" as used herein refers to any tangible storage and/or transmission medium that participates in storing and/or providing instructions to a processor for execution. Such a medium may take many forms, including but not limited to non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

FIG. 1 is a schematic functional block diagram showing an exemplary modular light control device 100 as is also described in commonly owned U.S. patent application Ser. No. 15/373,088, which is incorporated by reference in its entirety. As shown in FIG. 1, the modular light control device 100 drives at least one lamp (e.g., luminaire) 2 to emit light, and directs a control module 12 to perform a dimming control on the luminaire 2. In addition to the control module 12, the modular light control device 100 shown in FIG. 1 includes, among other things, a power conversion module 11 and a communication module 13. The luminaire 2 includes, for example but without limitation, a lighting device such as a light-emitting diode (LED) lamp. In various embodiments, luminaire 2 may be any number of luminaires. In addition, the present system is "modular" in that one or more of each of the power conversion module 11, control module 12, and communication module 13 is separately manufactured as an individual self-contained module, such that each of the power conversion module 11, the control module 12, and the communication module 13 may be provided as drop-in/plug and play (or, "Plug-N-Play")/Hot Swap modules. In computing, a plug and play device or computer bus is one with a specification that facilitates the discovery of a hardware component in a system without the need for physical device configuration or user intervention in resolving resource conflicts. A "hot swap" or to suggest a component is "hot swappable" means the replacement of the component, such as a hard drive, CD-ROM drive, power supply, or other device, with a similar device while the system using it remains in operation. The power conversion module 11, the control module 12, and the communication module 13 each have different functions, types, or patterns, and can be used to drive different luminaire(s) 2 to emit light in a dimming control manner in response to different control protocols/methods, control interfaces, and/or luminaires 2.

The power conversion module 11 has a conversion circuit 111 and a first recognition unit 112. The conversion circuit 111 can receive power from an external power source P, and convert the power source P into a power S1 for output. Herein, the power source P can be an alternating current (AC) power or a direct current (DC) power. The conversion circuit 111 of this embodiment includes, for example but without limitation, an AC/DC conversion circuit. In some embodiments, the conversion circuit 111 can be a DC/AC conversion circuit. Thus, different power conversion modules 11 can be selected in response to different power sources P and different designs of the luminaires 2. For example, if the power source P is 110VAC and the luminaire 2 is the LED lamp powered by the DC power source of 12 volts, then the conversion circuit 111 can be an AC-to-DC conversion circuit for converting the 110 VAC to 12 VDC, so that the output power S1 is a 12V DC power.

The control module 12 has an output circuit 121 and a second recognition unit 122. The output circuit 121 of the exemplary embodiment shown in FIG. 1 has a control interface 1211 including, for example but without limitation, a dimming control interface. Different output circuits 121 may have to be used in conjunction with different driving circuits (not shown) of the luminaires 2. For example, when the user selects a certain luminaire 2 and a control interface 1211 to perform the dimming control on the luminaire 2, the output circuit 121, which can work in conjunction with the driving circuit of the luminaire 2 and the corresponding control interface 1211, has to be selected.

Figure 7:
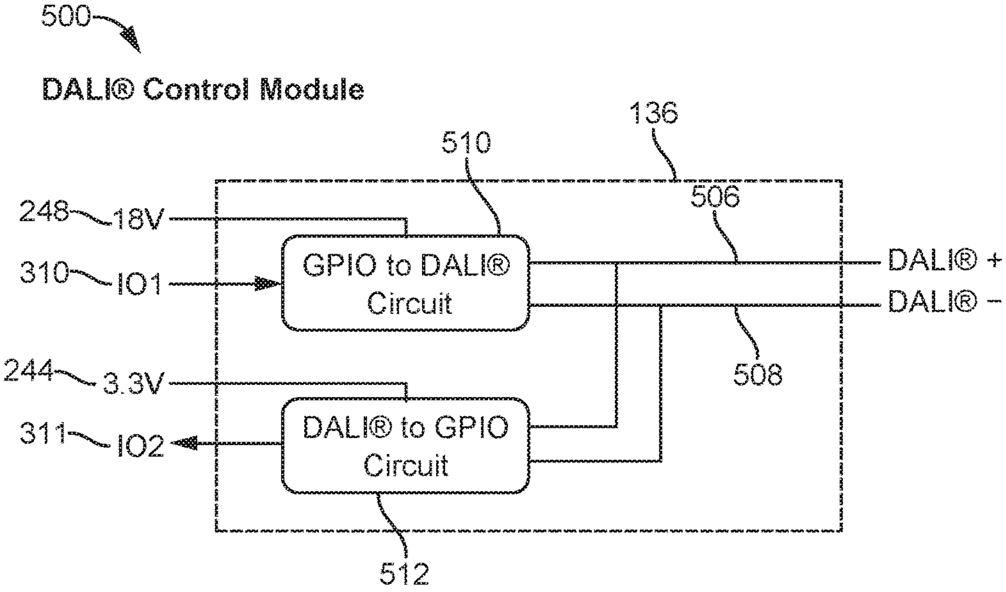
FIG. 7 illustrates an embodiment of a control module with DALI® protocol support as part of a three-part modular light gateway according to an embodiment.
Figure 8:
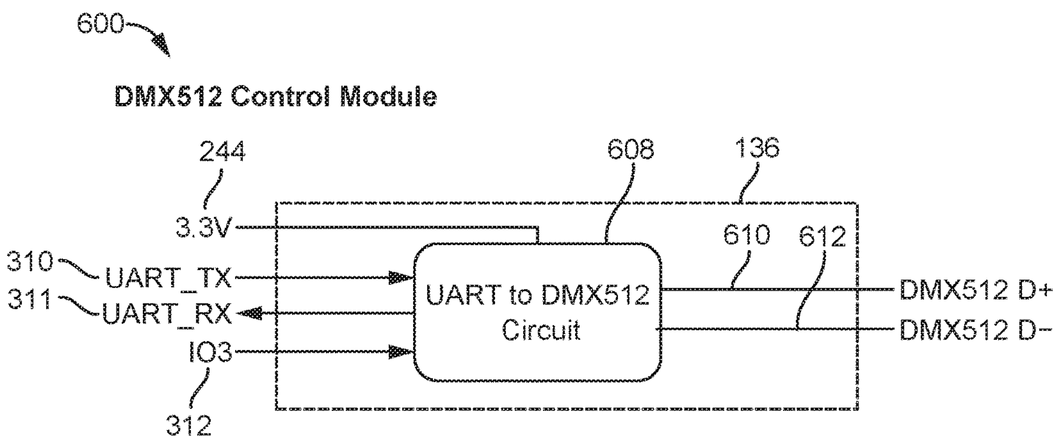
FIG. 8 illustrates an embodiment of the control module with DMX512 protocol support as part of a three-part modular light gateway according to an embodiment.
Figure 9:
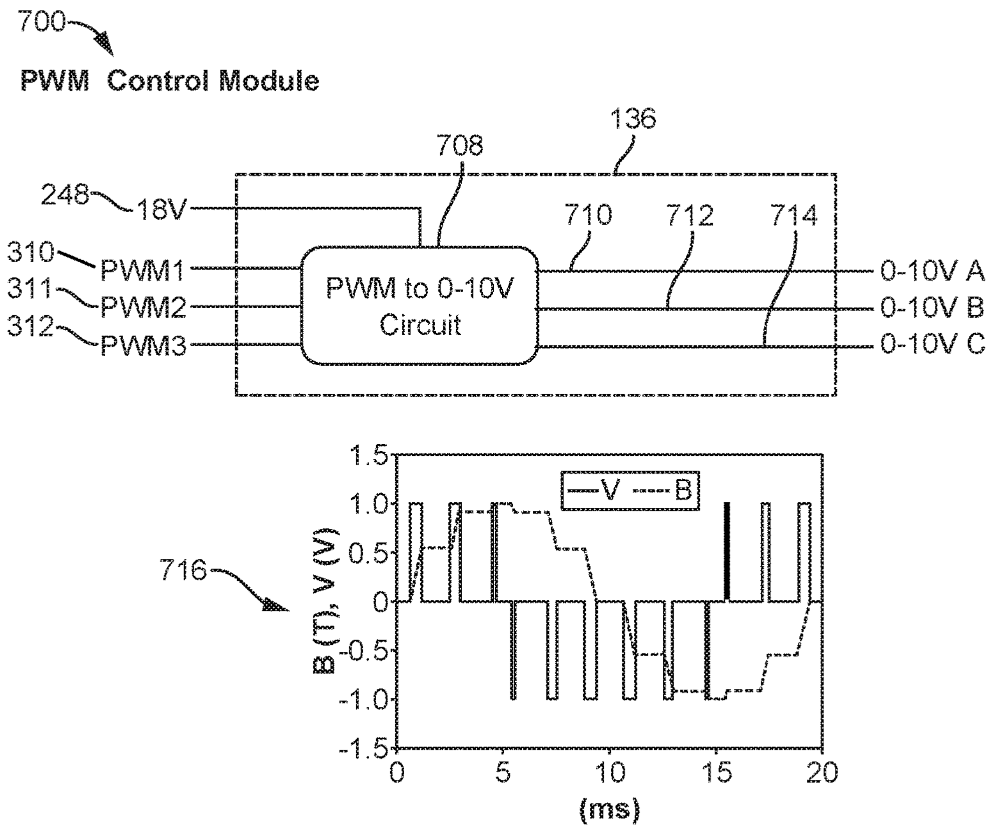
FIG. 9 illustrates an embodiment of the control module with PWM protocol support as part of a three-part modular light gateway according to an embodiment.

Each of the first recognition unit 112 of the power conversion module 11 and the second recognition unit 122 of the control module 12 may include, for example but without limitation, an address chip, a microcontroller (MCU), a pin (or referred to as a short-circuit pin), or a latch working in conjunction with a micro switch, or any arbitrary combination thereof. In the example of the address chip, the communication module 13 can obtain the configuration content of the corresponding power conversion module 11 or control module 12 according to the address data in the address chip through a look-up table. Specifically speaking, the communication module 13 can obtain the specification, model, state or control interface type, pattern and the like information of the power conversion module 11 or the control module 12 through the address chip, for example. In addition, the control interface 1211 of the output circuit 121 may be, e.g., a digital address lighting interface (DALI®) protocol interface such as shown in FIG. 7, a digital multiplex (e.g., DMX512) interface such as shown in FIG. 8, or a PWM/analog (e.g., 0-1V interface, 0-10V interface, or 1-10V interface) such as shown in FIG. 9, and the embodiments are not restricted thereto.

In addition, the communication module 13 may include a core control assembly of a modular light control system 300 (FIG. 3), and may include, for example, at least one central processing unit (CPU) (such as Bluetooth MCU 302 and/or WiFi MCU 402 in FIGS. 5 and 6, respectively) and a memory, or may include other control hardware, software or firmware. When the user selects the power conversion module 11, the control module 12, and the communication module 13 in response to the dimming control requirement, and electrically connects the communication module 13 with the power conversion module 11 and the control module 12, the communication module 13 distinguishes configurations of the power conversion module 11 (conversion circuit 111) and the control module 12 (output circuit 121) through the first recognition unit 112 and the second recognition unit 122, respectively, and outputs a control signal S2 according to the configuration of the control module 12 (output circuit 121). The output circuit 121 may also output a driving signal S3 to drive the luminaire 2 to emit light according to the power S1 outputted from the power conversion circuit 111 through the control module 12 and the control signal S2 outputted from the communication module 13, and to perform dimming control on the luminaire 2. The communication module 13 may also determine the pattern/type of control interface 1211 of the output circuit 121, because the communication module 13 has recognized the configuration of the control module 12 (output circuit 121) through the second recognition unit 122, and may make the control signal S2 generated thereby correspond to the pattern/type of the control interface 1211.

For example, when the control interface 1211 is the DALI® control interface and the user wants to apply the DALI® protocol/interface to control the luminaire 2, the power conversion module 11, the output circuit 121 (including the DALI® interface), and the corresponding communication module 13 may be selected to work in conjunction with the luminaire 2 and its driving circuit (e.g., 110 (FIG.

3)), and the communication module 13 is connected with the power conversion module 11 and the control module 12. Because the power conversion module 11 has the first recognition unit 112 and the control module 12 has the second recognition unit 122, the communication module 13 can distinguish the respective configuration(s) of the power conversion module 11 and the control module 12. The configuration(s) of the power conversion module 11 may include a type and function of the conversion circuit 111, and the configuration(s) of the control module 12 may include a type and function of each of the output circuit 121 and the control interface 1211. The communication module 13 distinguishes the respective configuration(s) of the power conversion module 11 and the control module 12 through the first recognition unit 112 and the second recognition unit 122. Thus, the communication module 13 can determine that the interface is, e.g., the DALI® interface, if the types and functions of the output circuit 121 and the control interface 1211 correspond thereto. In addition, the communication module 13 can output the control signal S2 corresponding to the DALI® interface in response to detecting the DALI® interface. Further, the output circuit 121 can generate the driving signal S3 to drive the luminaire 2 and perform dimming control according to the power S1 outputted from the conversion circuit 111 and the control signal S2 outputted from the communication module 13.

In addition, because the communication module 13 obtains the configuration of the power conversion module 11, the communication module 13 also outputs another control signal S4 to control the conversion circuit 111 to output the power S1 according to the configuration of the power conversion module 11. For example, the control signal S4 may be a pulse width modulation (PWM) signal and may control the switching of a switch element (not shown) of the conversion circuit 111 (i.e., to control the timing of turning power on and turning power off), so that the conversion circuit 111 can output the stable power S1 to the control module 12 according to the PWM technology.

As mentioned hereinabove, the modular design characteristic of the modular light control device 100 is applied in the exemplary embodiment shown in FIG. 1. When the user selects a certain lamp and a certain control method (interface), the communication module 13 distinguishes the configurations of the power conversion module 11 and the control module 12 in response to different lamps and control methods, and thus outputs the corresponding control signal (e.g., S2) to perform the corresponding dimming control on the luminaire 2, so that the better design flexibility can be achieved. In addition, the modular design can make the detection process of the troubleshooting process simpler by isolating a particular modular component in which a failure is detected. Accordingly, if the failure of a certain module is detected, then the module only needs to be replaced with a new one without replacing the overall control device. Thus, the embodiment may also have an easy maintenance property and lower cost.

In some embodiments, the power conversion module 11, the control module 12, and/or the communication module 13 can be a hot swap component which has the hot swap function for dynamically adjusting the internal setup or output to adapt the newly installed module. For purposes of this disclosure, "dynamic" means, generally, automatically adjustable or configurable in response to one or more changes in conditions or configurations. For example, when the system is powered on, the communication module 13 may correctly distinguish the configuration(s) of the latest inserted power conversion module 11 and/or control module 12 and dynamically adjust the internal setup or output of each/both of those module(s) to the corresponding configuration(s). Thus, in an exemplary instance such as when the power S1 outputted by the original power conversion module 11 is 3V and the power S1 outputted by a newly installed power conversion module 11 is 5V, the communication module 13 can not only distinguish the configuration of the newly installed power conversion module 11, but also dynamically adjust the internal setup thereof and change the setup of the control module 12 for adapting to the newly installed power conversion module 11. Accordingly, the modular light control device 100 can still operate normally after replacing one or more of the modules.

In an aspect of certain exemplary disclosed embodiments, variations of the circuit of the control module 12 are much more diversified for use with different luminaires 2, and the driving circuits thereof, so more types of parts need to be prepared in stock to satisfy the requirements on the control interface and maintenance in response to different luminaires 2. However, the variations of the circuits of the power conversion module 11 and the communication module 13 may not be as significant, and it may be unnecessary to prepare as many variations of parts in stock. Thus, the exemplary embodiments of a modular light control device described herein may have the advantage of requiring fewer parts in stock.

Figure 2:
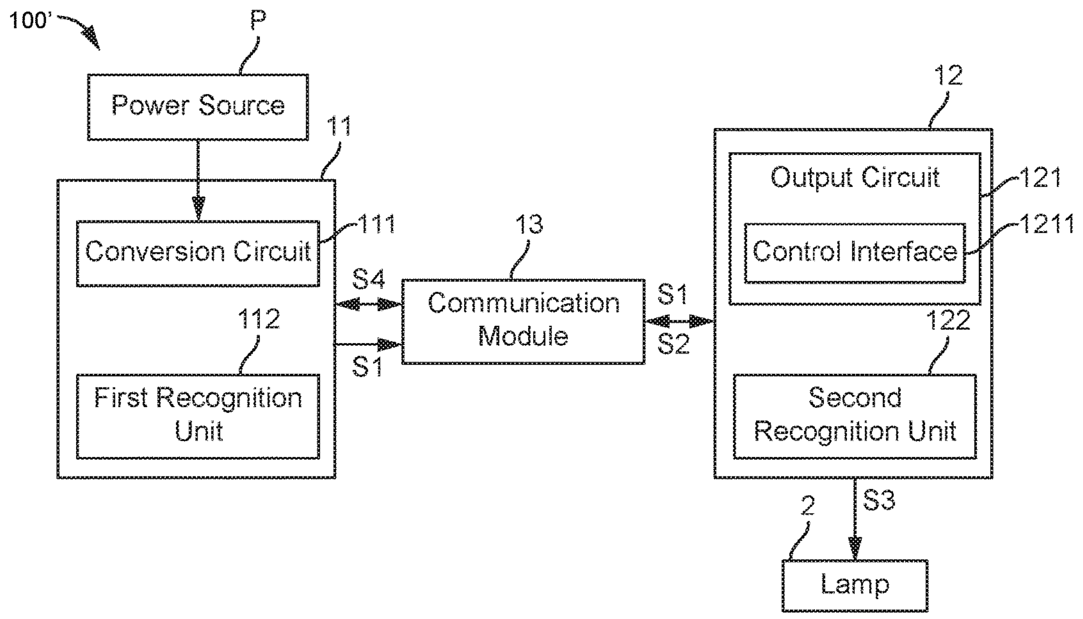
FIG. 2 is a schematic functional block diagram showing a modular light control device according to an embodiment.

FIG. 2 is a functional block diagram showing a modular light control device 100' according to another embodiment. Different from the modular light control device 100 shown in FIG. 1, the conversion circuit 111 of the modular light control device 100' shown in FIG. 2 outputs the power S1 to the control module 12 through the communication module 13. Other technical features of the exemplary modular light control device 100' shown in FIG. 2 correspond to the like-numbered aspects of the modular light control device 100 shown in FIG. 1, therefore the corresponding detailed description is omitted.

Figure 3:
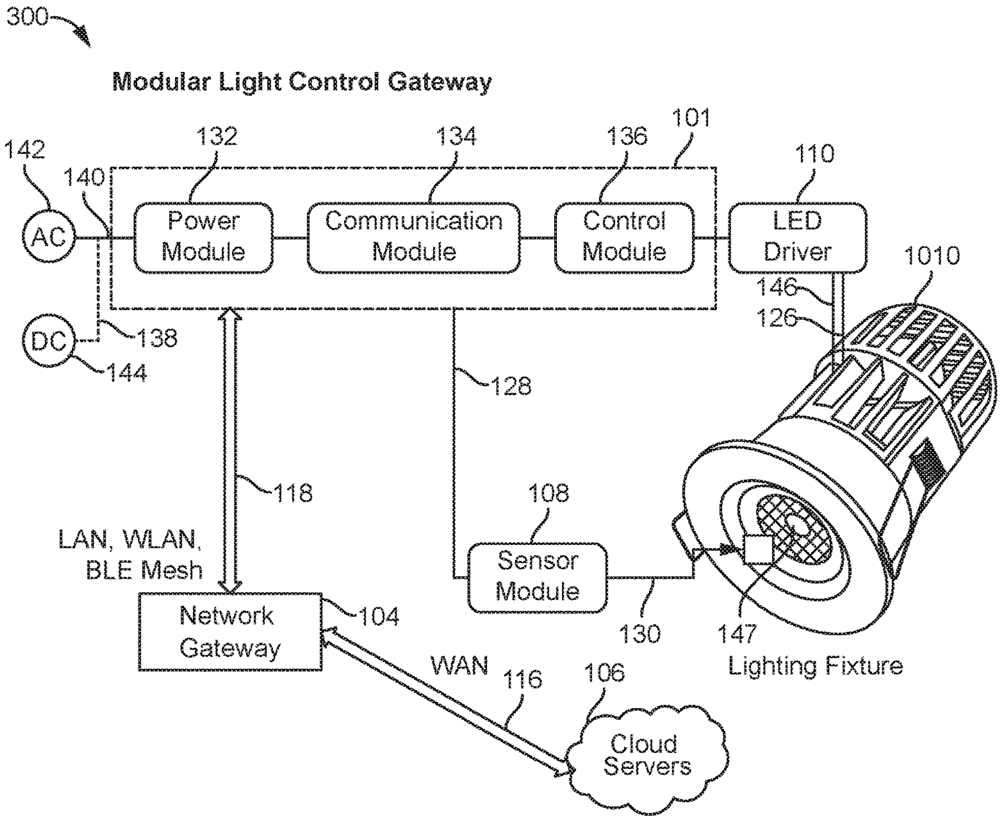
FIG. 3 illustrates a high-level system diagram of the modular lighting control gateway system according to an embodiment.

With reference now to FIG. 3, an exemplary embodiment of a modular light control system 300 is shown. According to an aspect, the system 300 includes at least one modular light control device (i.e., 100, 100') such as a gateway 101, depicted herein as a three-part modular light control gateway (gateway 101), at least one luminaire 1010, at least one LED 147, and a dimming control (LED) driver 110.

According to an aspect of the exemplary system 300 shown in FIG. 3, the modular gateway 101 is physically made of several separate hardware components such as a power module 132, a communication module 134, and a control module 136. These separate parts are called "modules" as that term has been previously described and used, and are interconnected. In addition, each of the modules 132, 134, 136 is respectively replaceable and can be removed and replaced with another similar module suited for the specific luminaire properties in the lighting system in which it is to be used. In other words, each module 132, 134, 136 may have two or more interchangeable (i.e., capable of being put or used in place of each other) different types of such module, as described in greater detail hereinbelow. As mentioned above, the modular gateway 101 in the exemplary embodiment shown in FIG. 3 is a combination of three separate modules, the power module 132, the communication module 134, and the control module 136, and each module may have an interchangeable counterpart of a different type (not shown) of such module. Each module can be designed using minimal capabilities, e.g., the power module 132 can support limited power like 110V or 220V. The communication module 134 can be a different physical module for any one of a plurality of different wireless or wired interfaces. The control module 136 can support a single dimming protocol (which can be any of a wide variety of different protocols without any limitations) or more than one dimming protocol. The respective modules 132, 134, 136 are interconnected and able to discover/recognize each other such that a correct protocol conversion between the modules may be performed. In addition, the control module 136 is connected to the luminaire/LED driver 110 and may be interchanged with a different control module 136 every time there is a need to adapt to, e.g., a different luminaire/LED driver 110 and/or dimming protocol.

In an aspect of the exemplary embodiments, the system 300 may include a single luminaire 1010 or multiple luminaires 1010 connected with a single common interface to power lines 146 and dimming control lines 126. The gateway 101 is also connected electrically to the luminaire 1010 via the power line 146. In an embodiment, the gateway 101 receives power via power lines 138, 140. The power input can be AC power 142 via power line 140, or DC power 144 via line 138, or both. In an aspect of the exemplary embodiments the configuration allows for both AC and DC power being available, and the DC power being used when the AC is not available, like in cases of power outage.

As illustrated in FIG. 3 and according to an aspect, the system 300 includes a sensor subsystem/module 108 that is positioned in a sensing relationship with the luminaire 1010 via a connection 130, and connected to the modular light control gateway 101 via a sensor interface 128 on the other side. According to an aspect of the exemplary embodiments, and without limitation, the connection 130 to the luminaire 1010 is physical and is not limited to a specific location. Each of the connections 128, 130 may be wired, wireless, or in any other configuration that provides data communication. The location of the sensor module 108 may be different for various types of sensors that are to be positioned. The physical sensor interfaces and connections may include the sensor interface 128 connected to the gateway 101.

According to an aspect, the system 300 includes a backhaul interface 118 connected to the gateway 101 and a network gateway 104. The backhaul interface 118 may be wired or wireless Local Area Network (LAN), including one or more of Mesh Bluetooth Low Energy (Mesh BLE), Smart Mesh, Bluetooth Mesh, WLAN, ZigBee, and/or Ethernet LAN. In an embodiment, the backhaul interface 118 is Mesh BLE. According to an aspect, the gateway 101 is connected with the network gateway 104, which resides between the local networks to a wide area network (WAN) 116, via the backhaul interface 118. In the exemplary disclosed embodiments, the WAN 116 connects the gateway 101 to cloud computers/servers 106 for operational and management interfaces. In the same or other embodiments, the computers and/or servers may be local computers/servers, dedicated computers/servers, or any other processing, storage, operating, and/or managing devices consistent with this disclosure.

Figure 4:
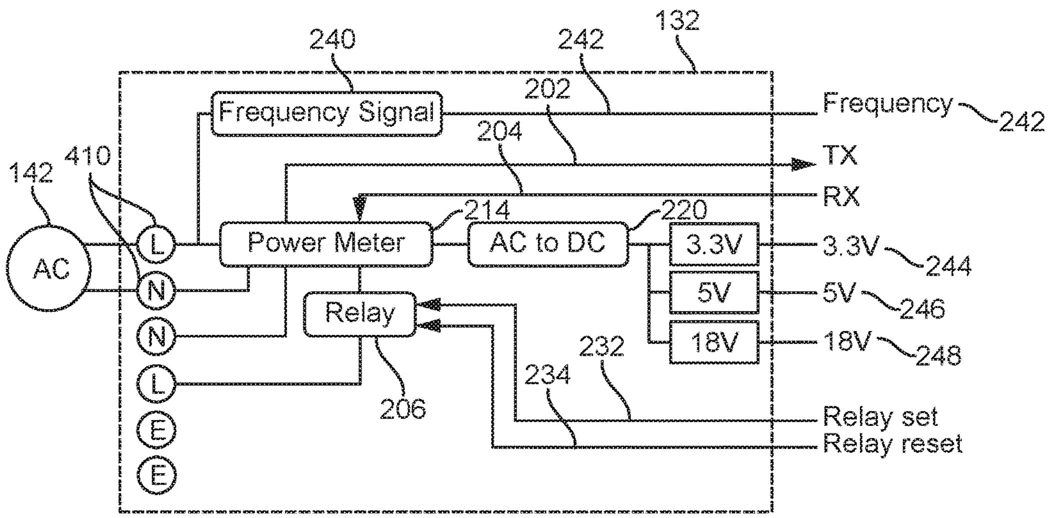
FIG. 4 illustrates an embodiment of a power module of a three-part modular light gateway according to an embodiment.

FIG. 4 illustrates an exemplary embodiment of the power module 132 of the three-part modular light control gateway 101, such as shown in FIG. 3. As shown in FIG. 4, the exemplary modular power module 132 receives an input from the AC power 142 via L and N line inputs 410 into and through a power meter 214. The power meter 214 is controlled via a relay 206 that can turn the power off and on. A relay set line 232 sets the relay control, and a relay reset line 234 resets the relay. The power meter 214 may measure the power being used by the gateway 101/system 300 and the frequency of the alternating current 142, among other factors. An AC to DC converter 220 converts AC power to DC power and delivers the DC power respectively on a 3.3V line 244, a 5V line 246, and an 18V line 248 to power other modules and connections as shown in, e.g., FIGS. 5-9, and discussed below with respect thereto. The power meter 214 provides measurements to, e.g., the communication module 134 via a TX line 202, and receives control from, e.g., the communication module 134 via an RX line 204. A frequency line 242 provides output from a frequency signal 240 to, among other things, provide the sensor subsystem/module 108 with the power supply frequency information.

Figure 5:
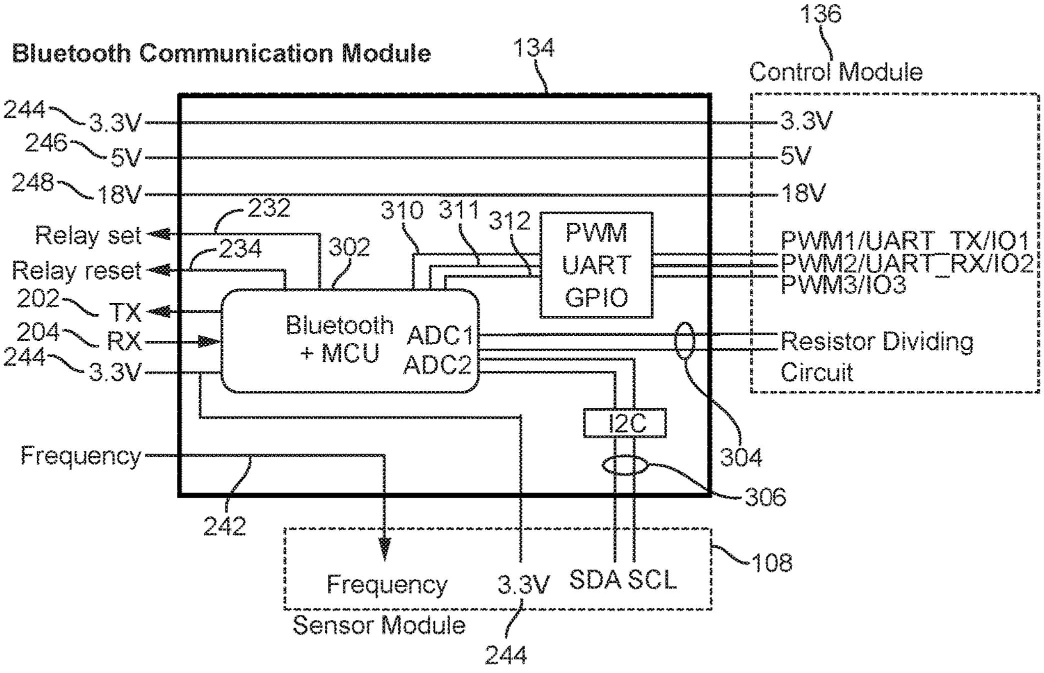
FIG. 5 illustrates an embodiment of a communication module with Bluetooth wireless support as part of a three-part modular light gateway according to an embodiment.

FIG. 5 illustrates an exemplary embodiment of the communication module 134 with Bluetooth wireless support as part of a three-part modular light control gateway 101. As shown in FIG. 5, the power from the 3.3V line 244, the 5V line 246, and the 18V line 248 acts as a pass-through to the control module 136. The 3.3V line 244 also splits and powers the Bluetooth Micro Controller Unit (MCU) 302 and the sensor module 108. The MCU 302 is both a wireless communication interface and a microcontroller used to manage information and run applications/protocols. The MCU 302 controls the relay lines 232 and 234 to set and reset the relay, respectively. The MCU 302 also handles the sensor input/output interfaces via the I2C lines 306. The frequency line 242 is connected to the sensor module 108. The MCU 302 includes multiple interfaces 310, 311, 312 configured for communicating with and controlling the control module 136. The nature of the interfaces 310, 311, 312 depends on the specific control module 136 being used. The physical lines 310, 311, 312 are used as is for multiple purposes to provide, e.g., PWM/Universal Asynchronous Receiver-Transmitter (UART)/General Purpose Input-Output (GPIO) interfaces for the control module 136. Line 310, for example, may act as a PWM1 input to a PWM control module 700 (see FIG. 9), as a transmitter (TX) UART (IO1) for a DMX512 control module 600 (see FIG. 8), and/or as a GPIO interface for the DALI® protocol control module 500 (see FIG. 7). Line 311 may act as PWM2 input to the PWM control module 700, as a receiver (RX) UART (IO2) for the DMX512 control module 600, and/or as a GPIO interface for the DALI® protocol control module 500. Line 312 may act as a PWM3 input to the PWM control module 700 and/or as an IO3 control interface for the DMX512 control module 600. The sensor module 108 receives power line 244, communication interface (I2C) 306, and frequency 242 from the communication module 134.

Figure 6:
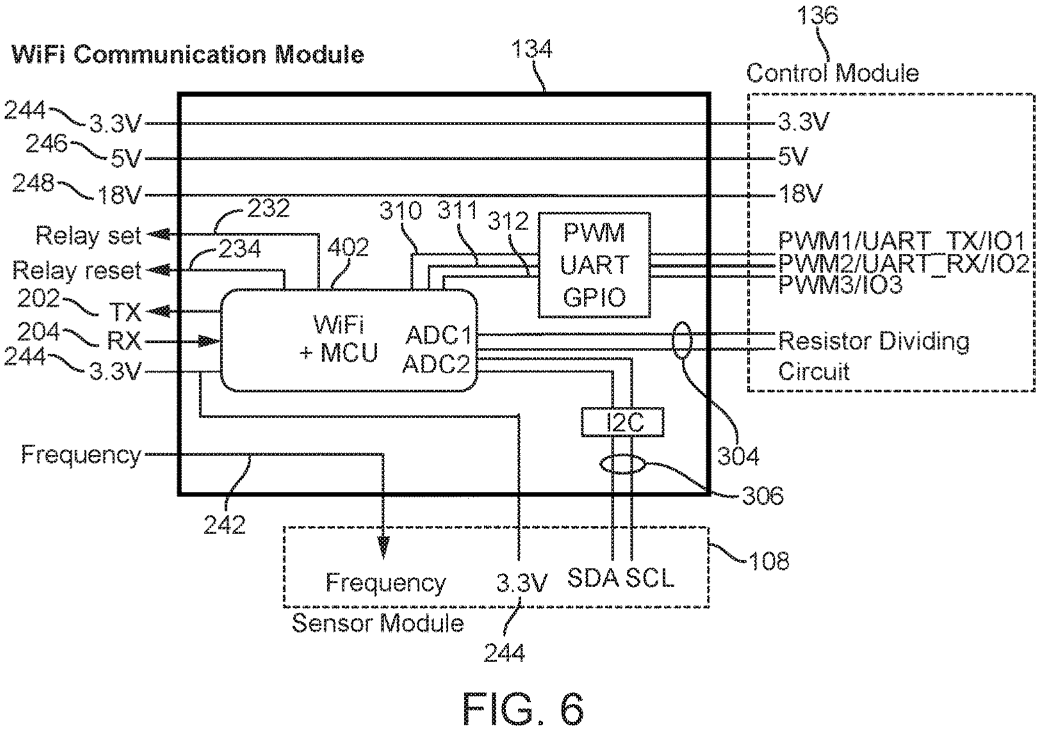
FIG. 6 illustrates an embodiment of the communication module with WiFi wireless support as part of a three-part modular light gateway according to an embodiment.

FIG. 6 illustrates an exemplary embodiment of the communication module 134 with WiFi wireless support as part of a three-part modular light control gateway 101. As shown in FIG. 6, the power from the 3.3V line 244, 5V line 246 and 18V line 248 acts as a pass-through to the control module 136. The 3.3V line 244 also splits and powers the Bluetooth Micro Controller Unit (MCU) 402 and the sensor module 108. The MCU 402 is both a wireless communication interface and a microcontroller used to manage information and run applications/protocols. The MCU 402 controls the relay lines 232 and 234 to set and reset the relay, respectively. The MCU 402 also handles the sensor input/output interfaces via the I2C 306 lines. The frequency line 242 is connected to the sensor module 108. The MCU 402 includes multiple interfaces 310, 311, 312 configured for communicating with and controlling the control module 136. The nature of the interfaces 310, 311, 312 depends on the specific control module 136 being used. The physical lines 310, 311, 312 can be used for multiple purposes to provide, e.g., PWM/UART/GPIO interfaces for the control module 136. Line 310, for example, may act as the PWM1 input to the PWM control module 700 (see FIG. 9), as the TX UART (IO1) for the DMX512 control module 600 (see FIG. 8), and/or as the GPIO interface for the DALI® protocol control module 500 (see FIG. 7). Line 311 may act as the PWM2 input to the PWM control module 700, as the RX UART (IO2) for the DMX512 control module 600, and/or as the GPIO interface for the DALI® protocol control module 500. Line 312 may act as the PWM3 input to the PWM control module 700 and/or as the IO3 control interface for the DMX512 control module 600. The sensor module 108 receives power line 244, communication interface (I2C) 306, and frequency 242 from the communication module 134.

FIG. 7 illustrates an exemplary embodiment of the control module 136 with DALI® protocol support as part of a three-part modular light gateway 101. The DALI® protocol module 500 is a DALI® adaptor that on one end communicates with the DALI® protocol-based luminaire driver (e.g., 110) via lines 506 and 508, and on the other end connects with the communication module 134 via lines 310 and 311. The GPIO to DALI® circuit 510 converts GPIO inputs and 18V line 248 input into DALI® protocol control messages at the appropriate DALI® line voltage. The DALI® to GPIO circuit 512 converts DALI® protocol messages back into GPIO messages using the 3.3V line 244 input for self-power.

FIG. 8 illustrates an exemplary embodiment of the control module 136 with DMX512 protocol support as part of a three-part modular light gateway 101. The DMX512 control module 600 uses UART to DMX512 circuit 608 for converting information from the UART_TX input/interface 310 to a DMX512 D+ output/interface 610, and from a DMX512 D− input/interface 612 to the UART_RX 311 output/interface. The 3.3V line 244 serves to power the module 600. The DMX512 D+ interface 610 and the DMX512 D− interface 612 are the power and control lines into a DMX512 standard interface. The IO3 interface 312 is used to control the features of the DMX512 control module 600.

FIG. 9 illustrates an exemplary embodiment of the control module 136 using pulse-width modulation (PWM) protocol 716 support as part of a three-part modular light gateway 101. As shown in FIG. 9, the control module 136 is a PWM control module 700. The inputs used in the PWM control module 700 are PWM1 310, PWM2 311, and PWM3 312 as control to the PWM to 0-10V circuit 708, as well as the 18V line 248 to PWM to 0-10V circuit 708. The PWM to 0-10V circuit 708 controls the conversion of the input power 248 to 0-10V over 3 interfaces 710, 712, 714. Depending on the input frequencies over the respective PWM interfaces 310, 311, 312, the output frequencies and power is directed to one or more of 0-10V interface A 710, 0-10V interface B 712, and 0-10V interface C 714.

In the exemplary disclosed embodiments, or other embodiments in accordance with the disclosure, the control module can either operate a single dimming protocol, or the control module can be a control module that simultaneously operates a plurality of different dimming protocols in two or more luminaires.

The components of the apparatus illustrated are not limited to the specific embodiments described herein, but rather, features illustrated or described as part of an embodiment can be used on or in conjunction with other embodiments to yield yet a further embodiment. It is intended that the apparatus include such modifications and variations. Thus, the various embodiments, configurations and aspects, include components, methods, processes, systems and/or apparatus substantially depicted and described herein, including various embodiments, sub-combinations, and subsets thereof. Further, steps described in the method may be utilized independently and separately from other steps described herein.

While the apparatus and method have been described with reference to specific embodiments, it will be understood by those skilled in the art that various changes may be made and equivalents may be substituted for elements thereof without departing from the scope contemplated. In addition, many modifications may be made to adapt a particular situation or material to the teachings found herein without departing from the essential scope thereof. Those of skill in the art will understand how to make and use the apparatus and method after understanding the present disclosure. The apparatus and method, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

In this specification and the claims that follow, reference will be made to a number of terms that have the following meanings. The singular forms "a," "an" and "the" include plural referents unless the context clearly dictates otherwise. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be." Thus, as used throughout this application, the word "may" is used in a permissive sense (i.e., meaning having the potential to), rather than the mandatory sense (i.e., meaning must). Similarly, the words "include", "including", and "includes" mean including but not limited to.

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

Advances in science and technology may make equivalents and substitutions possible that are not now contemplated by reason of the imprecision of language; these variations should be covered by the appended claims. This written description uses examples to disclose the method, machine and computer-readable medium, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

The foregoing discussion of the apparatus and method has been presented for purposes of illustration and description. The foregoing is not intended to limit the apparatus and method to the form or forms disclosed herein. In the foregoing Detailed Description for example, various features of the apparatus and method are grouped together in one or more embodiments, configurations, or aspects, for the purpose of streamlining the disclosure. The features of the embodiments, configurations, or aspects of the apparatus and method described herein, may be combined in alternate embodiments, configurations, or aspects other than those discussed above. This method of disclosure is not to be interpreted as reflecting an intention that the present apparatus and method requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment hereof.

Moreover, the description of the apparatus and method has included descriptions of one or more embodiments, configurations, or aspects, and certain variations and modifications, other variations, combinations, and modifications that are within the scope contemplated herein, as may be within the skill and knowledge of those in the art, after understanding the present disclosure. Furthermore, it is intended to obtain rights which include alternative embodiments, configurations, or aspects, to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A modular gateway for controlling illumination of a luminaire, comprising:

a power module;

a communication module; and, a control module, wherein the modular gateway is configured to control at least one of a dimming level and a dimming protocol of the luminaire, each of the power module, the communication module, and the control module is replaceable in the modular gateway, each of the power module, the communication module, and the control module is hot swappable, the power module includes a first recognition unit in data communication with the communication module and the control module includes a second recognition unit in data communication with the communication module, and the power module and the control module are configured to recognize each other via the communication module.

2. The modular gateway of claim 1, wherein the power module is configured to change a power supply in response to recognizing the control module.

3. The modular gateway of claim 1, wherein the modular gateway is configured to control at least one of a dimming level and a dimming protocol of at least two luminaires.

4. A system for configuring and maintaining a lighting system, comprising:

a modular gateway configured to control at least one of a dimming level and dimming protocol of a luminaire, wherein the modular gateway includes a power module, a communication module, and a control module, wherein each of the power module, the communication module, and the control module is replaceable in the modular gateway, each of the power module, the communication module, and the control module is a plug-and-play module, the power module includes a first recognition unit in data communication with the communication module and the control module includes a second recognition unit in data communication with the communication module, and the power module and the control module are configured to recognize each other via the communication module; and, a sensor subsystem, wherein the sensor subsystem is configured to measure at least one aspect of the light emitted by the luminaire and transmit data regarding the aspect of the light emitted by the luminaire to the modular gateway.

5. The system of claim 4, wherein the power module is configured to change a power supply in response to recognizing the control module.

6. The system of claim 4, wherein the modular gateway is configured to control at least one of a dimming level and a dimming protocol of at least two luminaires.

7. The system of claim 6, wherein the modular gateway is configured to determine the dimming protocol of each of the two luminaires.

8. The system of claim 4, wherein each of the power module, the communication module, and the control module is hot swappable.

9. The system of claim 4, wherein each of the power module, the communication module, and the control module respectively is replaceable in response to a failure of that module.

10. The system of claim 4, further comprising a server, wherein the sensor subsystem is configured to transmit the data regarding the aspect of the light emitted by the luminaire to the server, and the server is configured to instruct the gateway to change at least one of a current dimming level and a current dimming protocol of the luminaire, based at least in part on the data regarding the aspect of the light emitted by the luminaire.

11. The system of claim 10, wherein the server is configured to instruct the gateway to change at least one of the current dimming level and the current dimming protocol of the luminaire in response to at least one of the data regarding the aspect of the light emitted by the luminaire being outside of expected parameters and the data regarding the aspect of the light emitted by the luminaire being inconsistent with at least one of the current dimming level and the current dimming protocol of the luminaire.

12. The system of claim 11, wherein the server is configured to instruct the gateway to change at least one of the current dimming level and the current dimming protocol of the luminaire in response to data regarding changes in the aspect of the light emitted by the luminaire being inconsistent with expected changes in the aspect of the light emitted by the luminaire according to the current dimming protocol.

13. The system of claim 4, further comprising a server, wherein the sensor subsystem is configured to measure the aspect of the light emitted by the luminaire in response to control signals sent to the luminaire by the modular gateway, and transmit to the server data regarding the response, and the server is configured to determine a current dimming protocol of the luminaire based at least in part on the data regarding the response.

14. The system of claim 13, wherein the server is configured to detect a failure of the control module when at least one of the response in the aspect of the light emitted by the luminaire and the dimming level of the luminaire does not correlate with a current dimming protocol of the luminaire.

15. A method for configuring and maintaining a lighting system, comprising:

determining with a server a current dimming protocol of at least one luminaire; and, configuring a modular gateway with at least one of a power module, a communication module, and a control module, wherein the at least one of the power module, the communication module, and the control module is compatible with the current dimming protocol, and each of the power module, the communication module, and the control module is hot swappable.

16. The method of claim 15, wherein configuring the modular gateway with the at least one of the power module, the communication module, and the control module comprises replacing the respective module with a corresponding new module.

17. The method of claim 16, wherein replacing the respective module with the corresponding new module is in response to at least one of the respective module being incompatible with a dimming protocol of the luminaire and a failure of the respective module.

18. The method of claim 15, wherein determining a current dimming protocol of the luminaire comprises sending a control message from the modular gateway to the luminaire and measuring with a sensor subsystem a response of the luminaire to the control message.

* * * * *